(12) United States Patent
Chen et al.

(10) Patent No.: US 11,366,251 B2
(45) Date of Patent: Jun. 21, 2022

(54) SUPPORTING ELEMENT AND PORTABLE OPTICAL IMAGING LENS

(71) Applicant: GENIUS ELECTRONIC OPTICAL (XIAMEN) CO., LTD., Fujian (CN)

(72) Inventors: Wensen Chen, Fujian (CN); Shihui Wu, Fujian (CN); Minqiang Ye, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 51 days.

(21) Appl. No.: 16/686,213

(22) Filed: Nov. 18, 2019

(65) Prior Publication Data

US 2021/0072432 A1 Mar. 11, 2021

(30) Foreign Application Priority Data

Sep. 9, 2019 (CN) .......................... 201910849130.5

(51) Int. Cl.
*G02B 7/02* (2021.01)
*G02B 5/00* (2006.01)

(52) U.S. Cl.
CPC ............. *G02B 5/003* (2013.01); *G02B 7/021* (2013.01)

(58) Field of Classification Search
CPC . G02B 5/00; G02B 7/02; G02B 5/003; G02B 7/021
See application file for complete search history.

(56) References Cited

U.S. PATENT DOCUMENTS

| | | | |
|---|---|---|---|
| 2007/0133106 A1* | 6/2007 | Park ....................... | G02B 7/021 359/738 |
| 2015/0092270 A1* | 4/2015 | Wang ..................... | G02B 7/022 359/503 |
| 2015/0241656 A1* | 8/2015 | Choi ...................... | G02B 7/021 359/819 |
| 2017/0038561 A1* | 2/2017 | Lin ......................... | G02B 9/60 |
| 2017/0108627 A1* | 4/2017 | Chou ...................... | G02B 9/60 |
| 2018/0134006 A1* | 5/2018 | Lin ......................... | G02B 7/021 |
| 2018/0270404 A1* | 9/2018 | Ishida .................... | H01L 27/146 |
| 2020/0041750 A1* | 2/2020 | Wang ..................... | G02B 7/022 |
| 2020/0057238 A1* | 2/2020 | Wang ..................... | G02B 7/022 |
| 2020/0057283 A1* | 2/2020 | Wang ................. | G02B 13/0015 |

(Continued)

*Primary Examiner* — Balram T Parbadia
(74) *Attorney, Agent, or Firm* — JCIPRNET

(57) ABSTRACT

A supporting element includes a light-shielding portion and a supporting portion connected to the light-shielding portion. The light-shielding portion has a first surface, a second surface, a first inner-side connecting surface, and a first outer-side connecting surface. The first inner-side connecting and outer-side connecting surfaces connect the first and second surfaces, and face toward the inside and outside of the supporting element respectively. The first surface and the second surface are curved surfaces, and the first inner-side connecting surface further includes a first light-shielding surface adjacent to the first surface. The supporting portion has a third surface, a fourth surface, a second inner-side connecting surface, and a second outer-side connecting surface. The second inner-side connecting surface and the second outer-side connecting surface connect the third and the fourth surfaces, and face toward the inside and outside of the supporting element respectively. Furthermore, a portable optical imaging lens is also provided.

19 Claims, 10 Drawing Sheets

(56) References Cited

U.S. PATENT DOCUMENTS

| | | | |
|---|---|---|---|
| 2020/0169652 A1* | 5/2020 | Feng | G02B 27/0018 |
| 2020/0233176 A1* | 7/2020 | Feng | G02B 7/021 |
| 2020/0409020 A1* | 12/2020 | Yedid | G02B 7/021 |
| 2020/0409110 A1* | 12/2020 | Ma | H04N 5/2254 |
| 2020/0409111 A1* | 12/2020 | Ma | H04N 5/2254 |

* cited by examiner

SUPPORTING ELEMENT AND PORTABLE OPTICAL IMAGING LENS

CROSS-REFERENCE TO RELATED APPLICATION

This application claims the priority benefit of China application serial no. 201910849130.5, filed on Sep. 9, 2019. The entirety of the above-mentioned patent application is hereby incorporated by reference herein and made a part of this specification.

BACKGROUND

Technical Field

The disclosure relates to a supporting element and a portable optical imaging lens using the supporting element.

Description of Related Art

In recent years, the specifications of portable electronic products have been progressively evolving, and the size specifications of desired products are demanded to be lighter, thinner, shorter and smaller. Moreover, the mechanical assembly (for example, a supporting element) in a portable optical imaging lens has been targeted for further improvement.

However, the supporting element has commonly encountered the following issues. Usually, the design of the supporting element only takes the side cut of the outer shape into consideration, and only has limited influences on reducing the lens size in the radial direction. The inner-side connecting surface of the supporting element is planar, which may easily generate unnecessary flare. If the remaining thickness after side cutting is thick, the size reduction effect is limited. If the thickness is excessively thin, further processing becomes difficult, and the structure of the element is not strong enough. Therefore, reducing the lens size while being able to take the machinability of the supporting element as well as the imaging quality into consideration has become the key to make further development for people having ordinary skills in the art.

SUMMARY

The disclosure provides a supporting element with a relatively small size, and a portable optical imaging lens that can use the supporting element has fine optical imaging quality.

The disclosure provides a portable optical imaging lens with a relatively small size and fine optical imaging quality.

An embodiment of the disclosure provides a supporting element suitable for a portable optical imaging lens having an optical axis. The supporting element includes a light-shielding portion and a supporting portion. The light-shielding portion has a first surface, a second surface, a first inner-side connecting surface, and a first outer-side connecting surface. The first inner-side connecting surface and the first outer-side connecting surface connect the first surface and the second surface, the first inner-side connecting surface faces toward the inside of the supporting element, the first outer-side connecting surface faces toward the outside of the supporting element. The first surface and the second surface are curved surface, and the first inner-side connecting surface further includes a first light-shielding surface adjacent to the first surface. The supporting portion is connected to the light-shielding portion. The supporting portion is configured to support a lens element or a lens barrel of the portable optical imaging lens, and has a third surface, a fourth surface, a second inner-side connecting surface, and a second outer-side connecting surface. The second inner-side connecting surface and the second outer-side connecting surface connect the third surface and the fourth surface, the second inner-side connecting surface faces toward the inside of the supporting element, and the second outer-side connecting surface faces toward the outside of the supporting element. A first reference plane is defined. The first reference plane passes through a center of the first inner-side connecting surface and a center of the first outer-side connecting surface of the light-shielding portion and includes the optical axis. The first light-shielding plane intersects with the first reference plane to form a first intersection line. The first outer-side connecting plane intersects with the first reference plane to form a second intersection line. An acute angle θ1 included between an extension line of the first intersection line and an extension line of the second intersection line is less than or equal to 80.00 degrees.

An embodiment of the disclosure provides a supporting element suitable for a portable optical imaging lens having an optical axis. The supporting element includes a light-shielding portion and a supporting portion. The light-shielding portion has a first surface, a second surface, a first inner-side connecting surface, and a first outer-side connecting surface. The first inner-side connecting surface and the first outer-side connecting surface connect the first surface and the second surface, the first inner-side connecting surface faces toward the inside of the supporting element, the first outer-side connecting surface faces toward the outside of the supporting element. The first surface and the second surface are curved surface, and the first inner-side connecting surface further includes a first light-shielding surface adjacent to the first surface. The supporting portion is connected to the light-shielding portion. The supporting portion is configured to support a lens element or a lens barrel of the portable optical imaging lens, and has a third surface, a fourth surface, a second inner-side connecting surface, and a second outer-side connecting surface. The second inner-side connecting surface and the second outer-side connecting surface connect the third surface and the fourth surface, the second inner-side connecting surface faces toward the inside of the supporting element, and the second outer-side connecting surface faces toward the outside of the supporting element. A first reference plane is defined. The first reference plane passes through a center of the first inner-side connecting surface and a center of the first outer-side connecting surface of the light-shielding portion and includes the optical axis. The first light-shielding plane intersects with the first reference plane to form a first intersection line. The second surface intersects with the first reference plane to form a third intersection line. An obtuse angle α1 included between an extension line of the first intersection line and an extension line of the third intersection line is less than or equal to 170 degrees.

An embodiment of the disclosure provides a portable optical imaging lens, including a lens barrel, a plurality of lens elements having refractive power, and the foregoing supporting element. The lens elements are arranged and disposed in the lens barrel in sequence along an optical axis from an object side to an image side. The supporting element is disposed in the lens barrel.

In an embodiment of the disclosure, a second reference plane that is parallel to and different from the first reference plane is defined. The second reference plane passes through the first inner-side connecting surface and the first outer-side connecting surface of the light-shielding portion, and the first light-shielding surface and the first outer-side connecting surface intersect with the second reference plane to form another first intersection line and another second intersection line respectively, where an acute angle θ2 included between an extension line of the another first intersection line and the another second intersection line is less than or equal to 80.00 degrees. The acute angle θ2 is not equal to the acute angle θ1.

In an embodiment of the disclosure, a second reference plane that is parallel to and different from the first reference plane is defined. The second reference plane passes through the first inner-side connecting surface and the first outer-side connecting surface of the light-shielding portion, and the first light-shielding surface and the second surface intersect with the second reference surface to form another first intersection line and another third intersection line respectively, where an obtuse angle α2 included between an extension line of the another first intersection line and an extension line of the another third intersection line is less than or equal to 170.00 degrees. The obtuse angle α2 is not equal to the obtuse angle α1.

In an embodiment of the disclosure, a third reference plane that is parallel to the first reference plane and different from the first reference plane and the second reference plane is defined. The third reference plane passes through the first inner-side connecting surface and the first outer-side connecting surface of the light-shielding portion, and the first light-shielding plane and the first outer-side connecting surface intersect with the third reference plane to form still another first intersection line and still another second intersection line, where an acute angle θ3 included between an extension line of the still another first intersection line and an extension line of the still another second intersection line is less than or equal to 80.00 degrees. The acute angle θ3 is not equal to the acute angle θ1 or the acute angle θ2.

In an embodiment of the disclosure, a third reference plane that is parallel to the first reference plane and different from the first reference plane and the second reference plane is defined. The third reference plane passes through the first inner-side connecting surface and the first outer-side connecting surface of the light-shielding portion, and the first light-shielding plane and the second surface intersect with the third reference plane to form still another first intersection line and still another third intersection line, where an obtuse angle α3 included between an extension line of the still another first intersection line and an extension line of the still another third intersection line is less than or equal to 170.00 degrees. The obtuse angle α3 is not equal to the obtuse angle α1 or the obtuse angle α2.

In an embodiment of the disclosure, in the supporting portion, at least one of the third surface and the fourth surface includes a glue blocking wall or a glue storage groove.

In an embodiment of the disclosure, a groove depth of the glue storage groove is within a range from 0.01 millimeters to 0.15 millimeters.

In an embodiment of the disclosure, at least one of the third surface and the fourth surface includes a glue storage groove and a bulge, the bulge is located beside the glue storage groove, and the bulge is located between the glue storage groove and the second outer-side connecting surface.

In an embodiment of the disclosure, the supporting element satisfies a following conditional expression: $4.00 \leq D1/D_{max} \leq 27.00$, D1 is a minimum distance between the first outer-side connecting surface of the light-shielding portion and the optical axis, and $D_{max}$ is a maximum distance between the first outer-side connecting surface and the first inner-side connecting surface of the light-shielding portion.

In an embodiment of the disclosure, the supporting element satisfies a following conditional expression: $2.00$ millimeters$\leq D1 \leq 4.00$ millimeters, where D1 is a minimum distance between the first outer-side connecting surface of the light-shielding portion and the optical axis.

In an embodiment of the disclosure, in the light-shielding portion, the first light-shielding surface of the first inner-side connecting surface is an arc surface.

In an embodiment of the disclosure, the foregoing light-shielding portion is exposed in an environment medium.

In an embodiment of the disclosure, the foregoing light-shielding portion is not in contact with a lens element or the lens barrel adjacent to the light-shielding portion.

In the supporting element and the portable optical imaging lens in the embodiments of the disclosure, because the first surface and the second surface of the light-shielding portion are curved surfaces, the size of the lens element in the radical direction can be further reduced.

In addition, the first reference plane is defined, where the first reference plane passes through the center of the first inner-side connecting surface and the center of the first outer-side connecting surface of the light-shielding portion, and includes the optical axis of the portable optical imaging lens. The first light-shielding surface, the first outer-side connecting surface, and the second surface intersect with the first reference plane to form the first intersection line, the second intersection line, and the third intersection line respectively. In the supporting element in the embodiments of the disclosure, the acute angle θ included between the extension line of the first intersection line and the extension line of the second intersection line is less than or equal to 80 degrees, or the obtuse angle α included between the extension line of the first intersection line and the extension line of the third intersection line is less than or equal to 170 degrees. The supporting element satisfies at least one of the foregoing designs, so that the first light-shielding surface can be closer to the surface of the lens element, thereby effectively shielding unnecessary flare. Accordingly, the portable optical imaging lens using the supporting element has fine imaging quality.

To make the features and advantages of the disclosure clear and easy to understand, the following gives a detailed description of embodiments with reference to accompanying drawings.

DESCRIPTION OF THE EMBODIMENTS

To facilitate description of a supporting element in embodiments of the disclosure, it may be considered that in space constituted by an X axis, a Y axis, and a Z axis, the X axis, the Y axis, and the Z axis are vertical to each other pairwise, and the X axis coincides with an optical axis of a portable optical imaging lens.

Figure 1A:
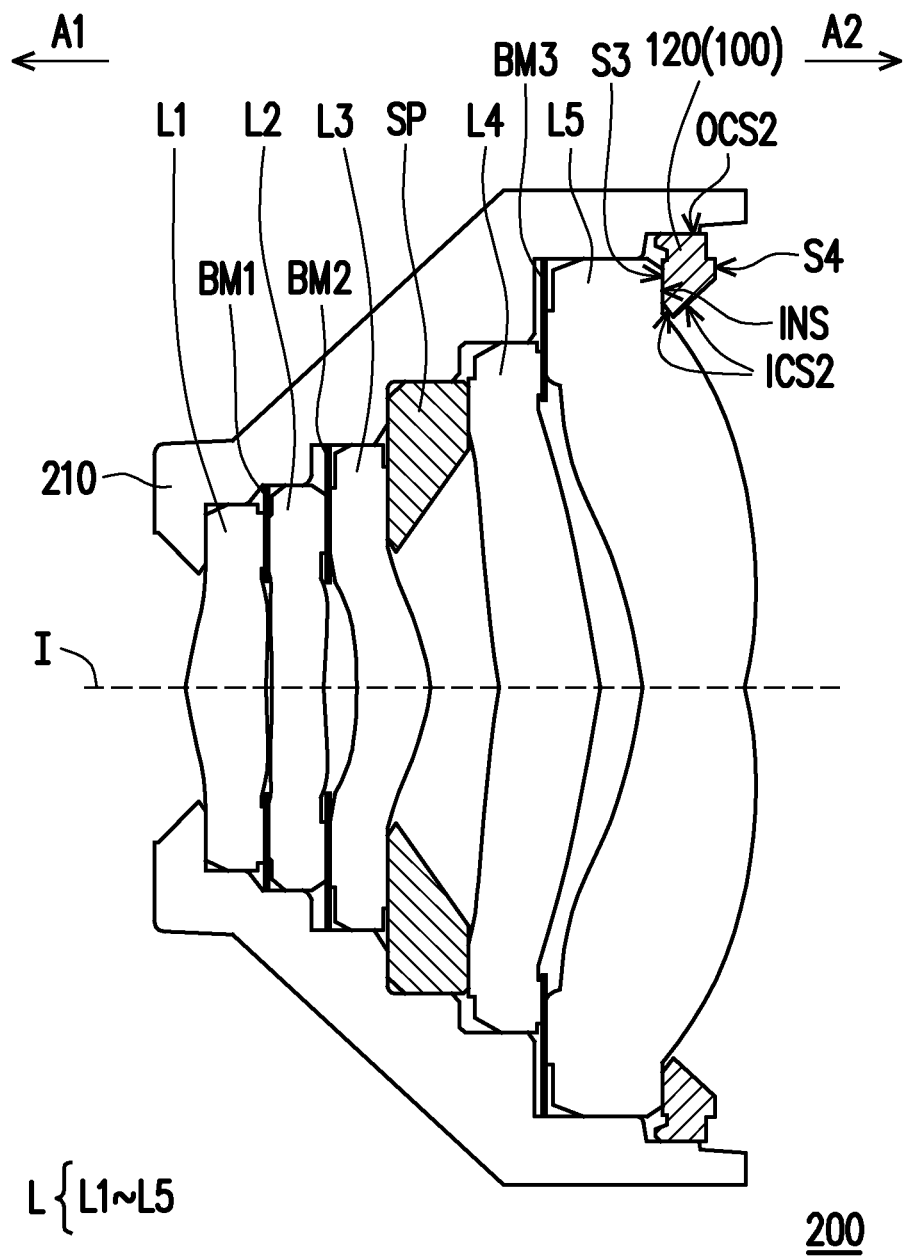
FIG. 1A and FIG. 1B are respectively schematic cross-sectional views of a supporting portion and a light-shielding portion of a supporting element of a portable optical imaging lens according to an embodiment of the disclosure.
Figure 1B:
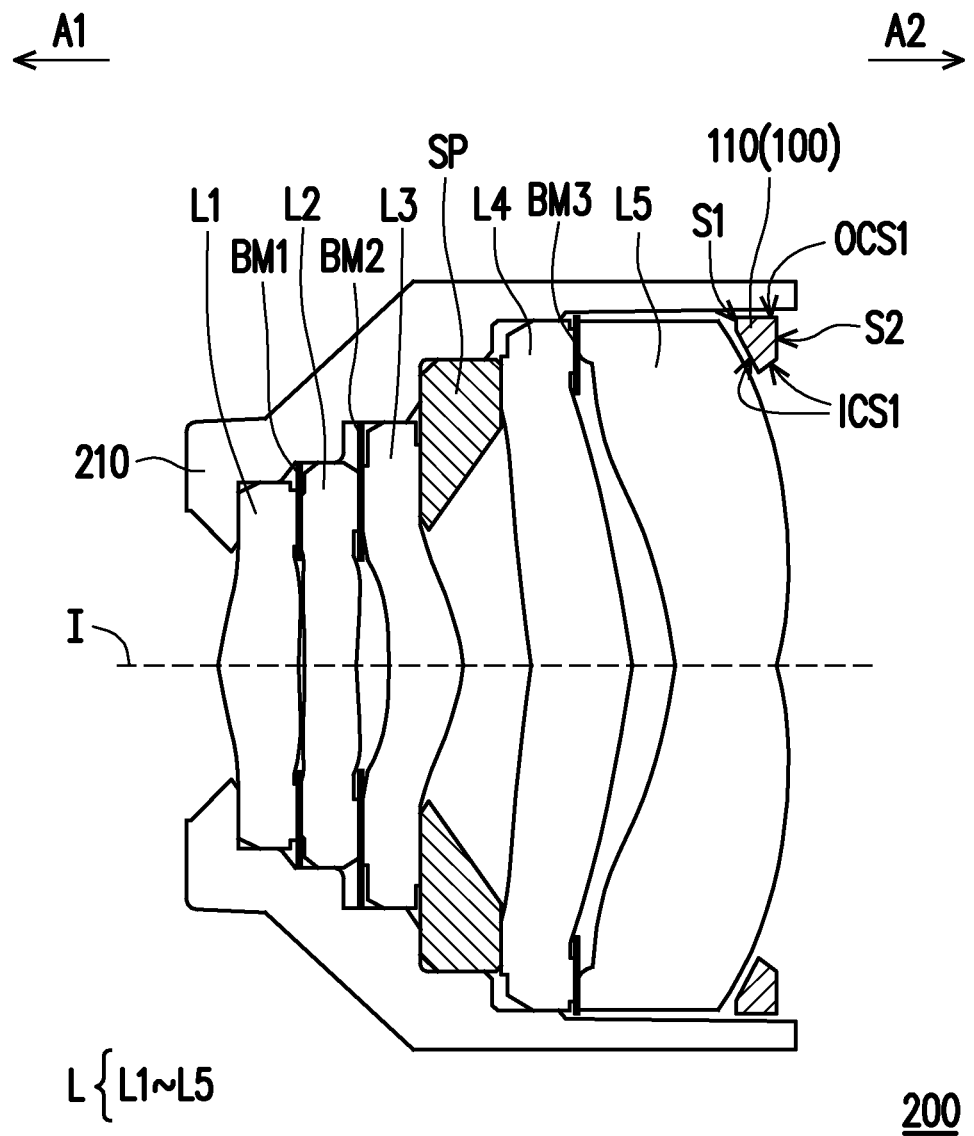
Figure 2:
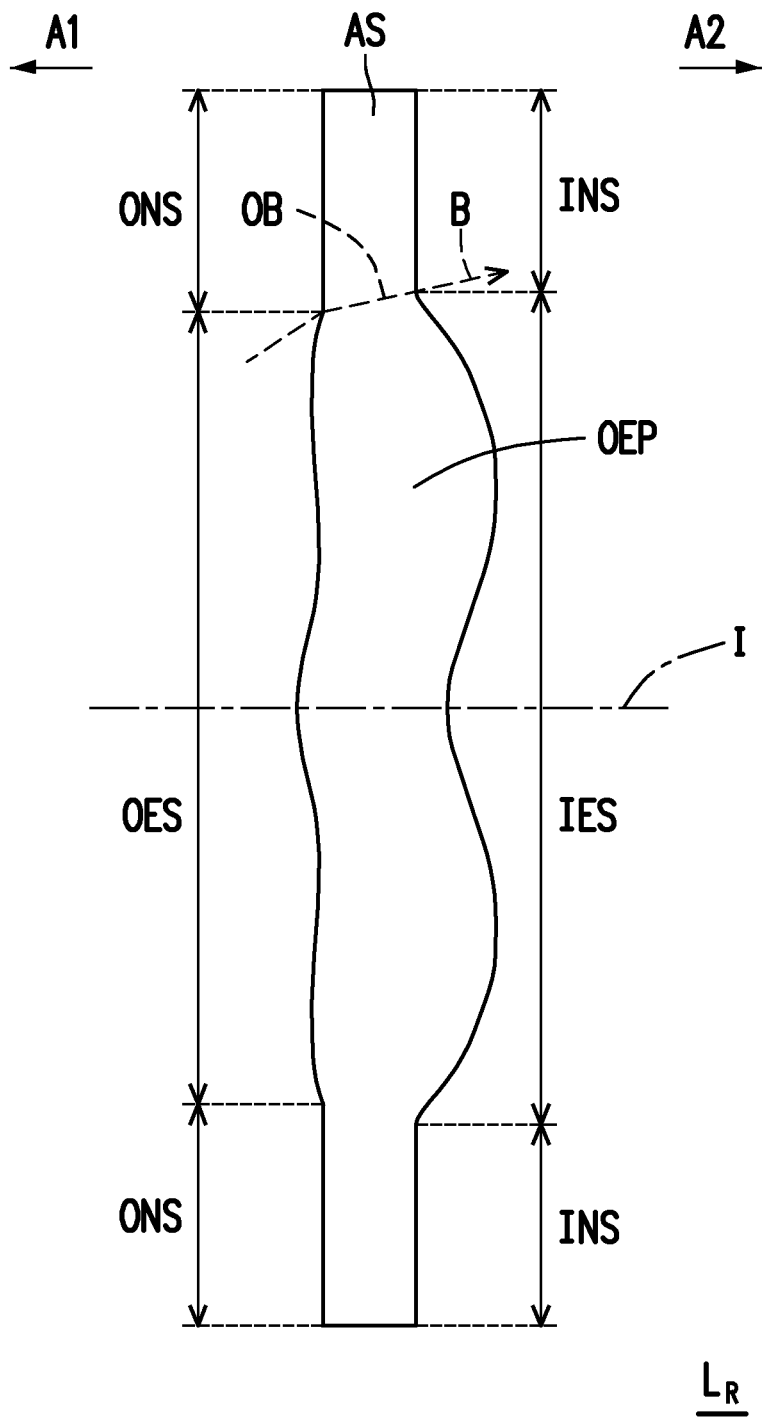
FIG. 2 is a schematic diagram of a radical direction of a reference lens element that can be applied to the portable optical imaging lens in FIG. 1A and FIG. 1B.
Figure 3:
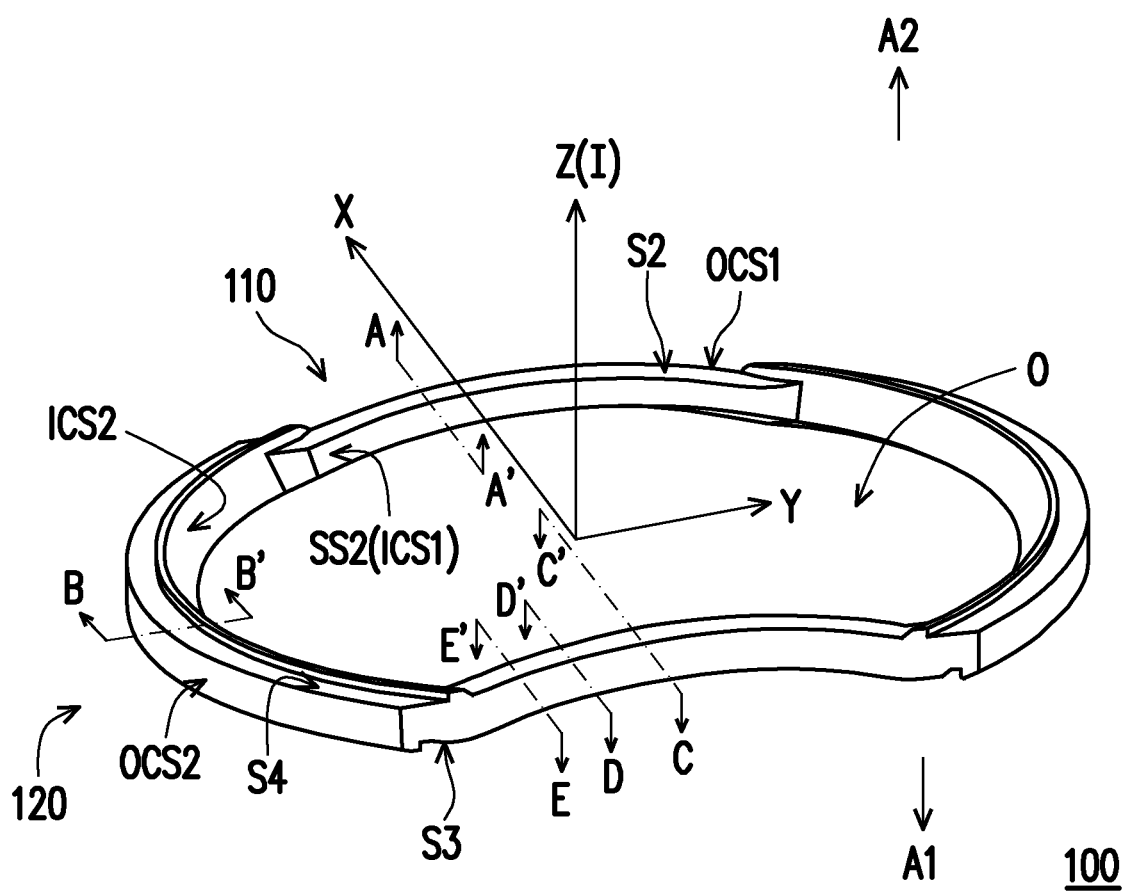
FIG. 3 is a schematic view of an appearance of the supporting element in FIG. 1A and FIG. 1B.
Figure 4A:
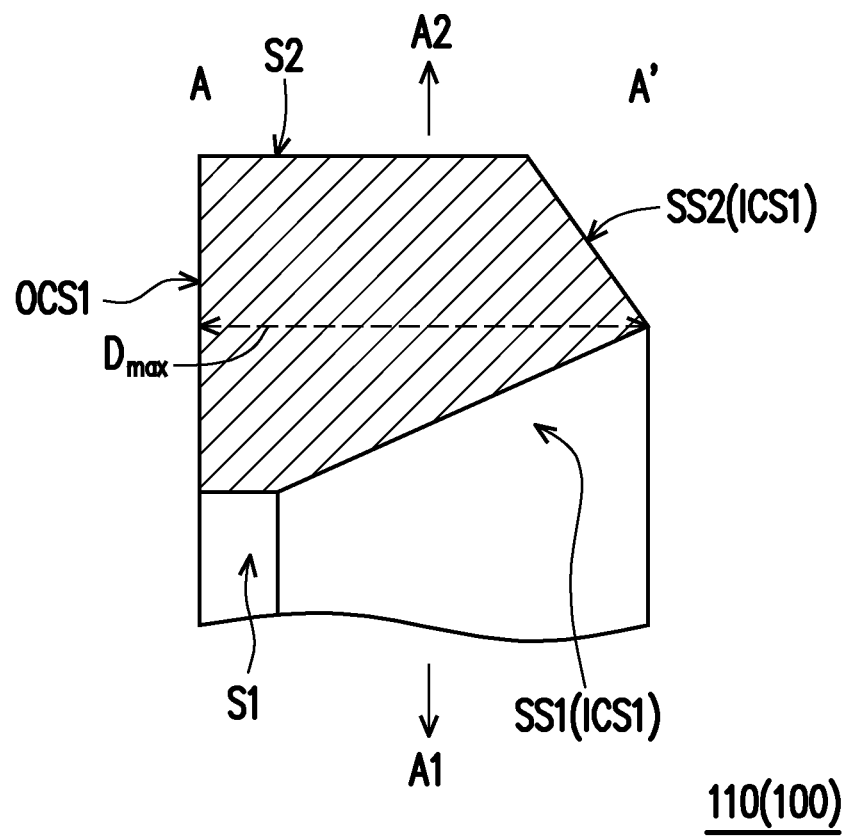
FIG. 4A and FIG. 4B are respectively schematic cross-sectional views of a cross-section A-A' and a cross-section B-B' of FIG. 3.
Figure 4B:
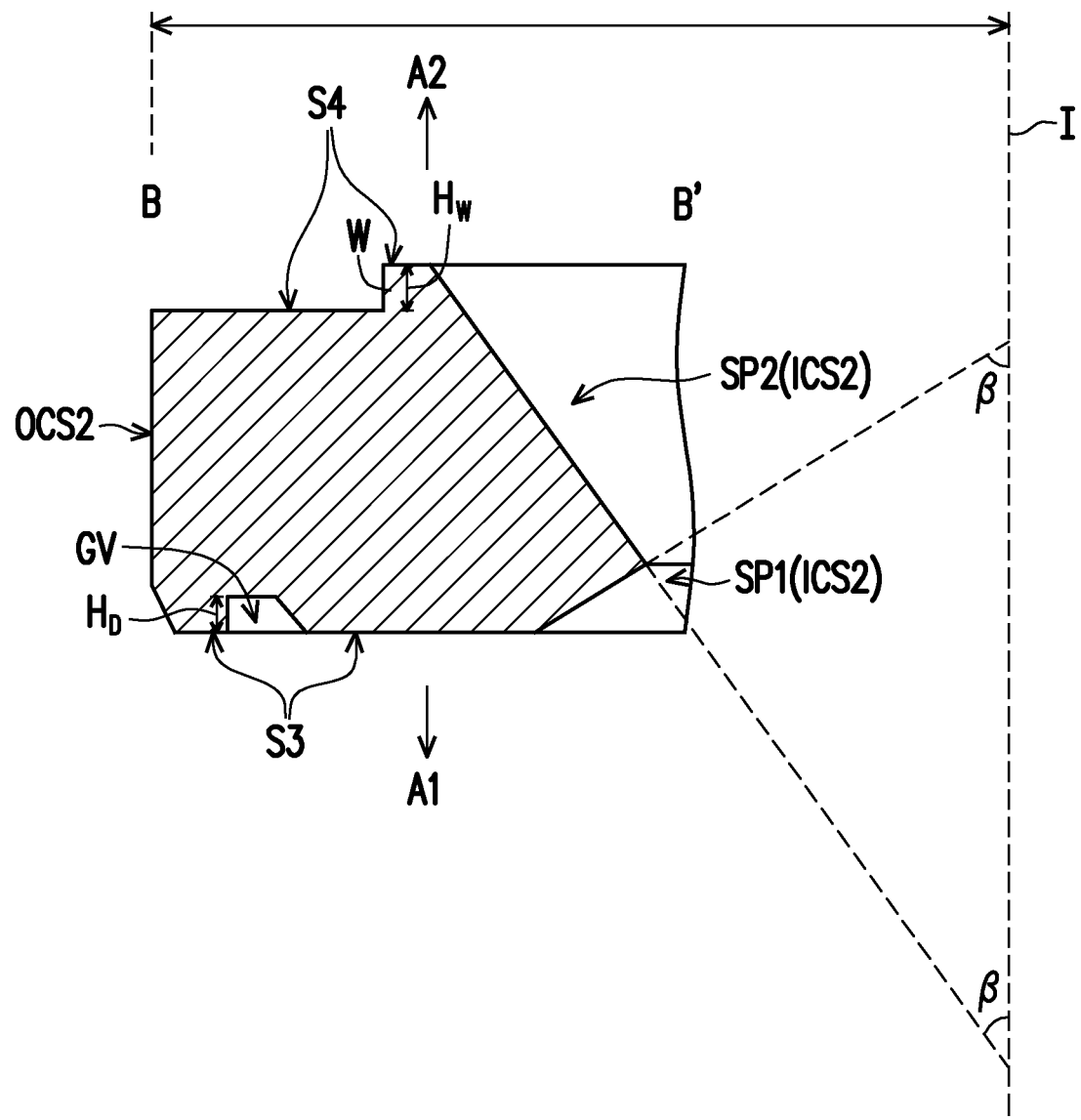

FIG. 1A and FIG. 1B are respectively schematic cross-sectional views of a supporting portion and a light-shielding portion of a supporting element of a portable optical imaging lens according to an embodiment of the disclosure. FIG. 2 is a schematic diagram of a radical direction of a reference lens element that can be applied to the portable optical imaging lens in FIG. 1A and FIG. 1B. FIG. 3 is a schematic view of an appearance of the supporting portion in FIG. 1A and FIG. 1B. FIG. 4A and FIG. 4B are respectively schematic cross-sectional views of a cross-section A-A' and a cross-section B-B' of FIG. 3.

Referring to FIG. 1A and FIG. 1B, in the present embodiment, a portable optical imaging lens 200 may be applied to a portable optical imaging system such as a lens of a camera, a lens of a mobile phone, or a lens of a telescope, and this is not limited in the disclosure. The portable optical imaging lens 200 has an optical axis I, and includes a lens barrel 210, a plurality of lens elements L, a plurality of light-shielding elements BM1 to BM3, a spacer element SP, and a supporting element 100. There is, for example, one supporting element 100, but this is not limited. The foregoing elements will be described in detail in the following paragraphs.

The lens barrel 210 is an element configured to accommodate the lens elements L, and has a function of protecting the lens elements L and a light path inside the portable optical imaging lens 200.

Each of these lens elements L is, for example, a dioptric optical element. In the present embodiment, the portable optical imaging lens 200 includes, for example, five lens elements L1 to L5, or six, seven, or even eight lens elements or less than five lens elements, for example, three or four lens elements. A quantity of lens elements is only an example, and is not limited in the disclosure.

A reference $L_R$ in FIG. 2 is used as an example to describe the foregoing lens element L. To be specific, based on different functions, each lens element L may be divided into an optical effective portion OEP and an assembly portion AS. Referring to FIG. 2, the lens element $L_R$ may receive an imaging light B that is incident to the portable optical imaging lens 200 and that is parallel to the optical axis I and forms a half field of view (HFOV) relative to the optical axis I, and the imaging light B passes through the portable optical imaging lens 200 and forms an image on a back-end imaging surface (not shown). The optical effective portion OEP is defined by the imaging light B. The optical effective portion OEP has an object-side optical effective surface OES facing the object side A1 and an image-side optical effective surface IES. In the embodiment of the disclosure, the object-side optical effective surface OES (or the image-side optical effective surface IES) of the lens element $L_R$ is defined as a specific range within which the imaging light B passes through the lens element and faces a surface of the object side A1 (or a surface of the image side A2). In addition, the lens element $L_R$ may further include the assembly portion AS extended outside along a radical direction of an optical boundary OB. The assembly portion AS is usually configured to assemble the lens element $L_R$ in the lens barrel 210. The imaging light B does not reach the assembly portion AS, and therefore, the assembly portion AS may be considered as an optical non-effective portion in the lens element $L_R$. In the assembly portion AS, a surface facing the object side A1 is referred to as an object-side optical non-effective surface ONS, and a surface facing the image side A2 is referred to as an image-side optical non-effective surface INS. The object-side optical non-effective surface ONS is connected to the object-side optical effective surface OES, and the image-side optical non-effective surface INS is connected to the image-side optical effective surface IES. A shape of a surface of the lens element $L_R$ in FIG. 2 is merely used for description, and does not limit the scope of the disclosure.

The spacer element (SP) is an element configured to separate two adjacent lens elements L to enable the lens elements L to keep a space.

The light-shielding portion BM is an optical element that has a function of shielding lights. In the present embodiment, there are, for example, three light-shielding portions that are marked as BM1 to BM3 for example.

A supporting element 100 mainly serves to provide supporting force for the lens element L to prevent the lens element L from moving along the optical axis I. An appearance design of the supporting element 100 will be described in the following paragraphs with reference to the foregoing figures.

Referring to FIG. 3, in the present embodiment, a supporting element 100 includes a light-shielding portion 110 and a supporting portion 120 connected to the light-shielding portion 110. Appearances of the light-shielding portion 110 and the supporting portion 120 are described in the following paragraphs.

First, an appearance of the light-shielding portion 110 is described. Referring to FIG. 1B, FIG. 3, and FIG. 4A, the light-shielding portion 110 has a first surface S, a second surface S2, a first inner-side connecting surface ICS1, and a first outer-side connecting surface OCS1. The first surface S1 and the second surface S2 are opposite to each other. Both the first inner-side connecting ICS1 and the first outer-side connecting surface OCS1 connect the first surface S1 and the second surface S2, the first inner-side connecting surface ICS1 faces toward the inside of the supporting element 100, the first outer-side connecting surface OCS1 faces toward the outside of the supporting element 100. In the present embodiment, the first surface S1 and the second surface S2 are curved surfaces. The first inner-side connecting surface ICS1 includes a first light-shielding surface SS1 and a second light-shielding surface SS2 that have different extension directions, where the first light-shielding surface SS1 is adjacent to the first surface S1 and is directly connected to the first surface S1, and the second light-shielding surface SS2 is adjacent to the second surface S2 and is directly connected to the second surface S2. The first outer-side connecting surface OCS1 is a continuous surface.

It should be noted that, the first surface S1 and the second surface S2 of the light-shielding portion 110 may further be, for example, designed as aspheric surfaces. In the portable optical imaging lens 200, surface shapes of some lens elements L may be designed as aspheric surfaces. Therefore, the first surface S1 and the second surface S2 are designed as aspheric surfaces to adapt to the surface shapes of the lens elements L. In this design, flares can be further shielded.

In addition, in the present embodiment, the first light shielding surface SS1 of the first inner-side connecting surface ICS1 is a plane. Because surfaces of some lens elements are aspheric surfaces, a shape of the first shielding surface may be designed as an arc surface to adapt to shapes of the surfaces of the lens elements in other implementation, and the arc surface may be designed as an aspheric surface. In this design, the supporting element can be closer to the surface of the lens elements. This is not limited in the disclosure.

Then, an appearance of the supporting portion 120 is described. Referring to FIG. 1A, FIG. 3, and FIG. 4B, the supporting portion 120 has a third surface S3, a fourth surface S4, a second inner-side connecting surface ICS2, and a second outer-side connecting surface OCS2. The third surface S3 and the fourth surface S4 are opposite to each other. Both the second inner-side connecting surface ICS2 and the second outer-side connecting surface OCS2 connect the third surface S3 and the fourth surface S4, the second inner-side connecting surface ICS2 faces toward the inside of the supporting element 100, and the second outer-side connecting surface OCS2 faces toward the outside of the supporting element 100. The second inner-side connecting surface ICS2 includes a first supporting plane SP1 and a second supporting plane SP2 that have different extension directions, where the first supporting plane SP1 is adjacent to the third surface S3 and is directly connected to the third surface S3, and the second supporting plane SP2 is adjacent to the fourth surface S4 and is directly connected to the fourth surface S4. The second outer-side connecting surface OCS2 is a continuous surface.

Specifically, referring to FIG. 4B, in the supporting portion 120, the third surface S3 is selectively provided with a glue storage groove GV, and the fourth surface S4 is selectively provided with a glue blocking wall W. In other words, the supporting portion 120 in the present embodiment is provided with both the glue storage groove GV and the glue blocking wall W. In other different implementations, one of the glue blocking wall and the glue storage groove may be provided on the third surface and the fourth surface of the supporting portion, and this is not limited in the disclosure. In this design, in a process of performing glue dispensing on the portable optical imaging lens 200, glue may be blocked by the glue blocking wall W, or the glue may be exported to the glue storage groove GV. In this way, the glue may be prevented from overflowing to the surface of the lens element L.

Carrying on with the foregoing, in the present embodiment, a range of a groove depth HD of the glue storage groove GV is, for example, within a range from 0.01 millimeters to 0.15 millimeters. If the groove depth HD of the glue storage groove GV is less than 0.01 millimeters, it is difficult to prevent from overflowing to the surface of the lens element L, and if the groove depth HD of the glue storage groove GV exceeds 0.15 millimeters, manufacturing difficulty is increased, for example, it is difficult to demould after molding. In another aspect, a range of a height Hw of the glue blocking wall W is, for example, within a range from 0.03 millimeters to 0.10 millimeters. If the height Hw of the glue blocking wall W is less than 0.03 millimeters, it is difficult to prevent glue from overflowing to the surface of the lens element L, and if the height Hw of the glue blocking wall W exceeds 0.10 millimeters, an excessive height may affect assembly. In the present embodiment, the groove depth HD of the glue storage groove GV and the height Hw of the glue blocking wall W are respectively 0.03 millimeters and 0.05 millimeters.

In addition, a surface processing manner of the first inner-side connecting surface ICS1 of the light-shielding portion 110 or the second inner-side connecting surface ICS2 of the supporting portion 120 may be any one following manners: for example, sand blasting surface processing, laser carving surface processing, thread surface processing, or jagged surface processing, surface roughness of the first inner-side connecting surface ICS1 and the second inner-side connecting surface ICS2 is at least 0.20 micrometers. A better roughness range is, for example, within a range from 0.20 micrometers to 2.00 micrometers. In this design, problems may occur on a surface of the first inner-side connecting surface ICS1 and a surface of the second inner-side connecting surface ICS2 due to different flares, and different surface processing is performed, to avoid generation of flares.

In addition, it should be noted that, in the foregoing light-shielding portion 110, the first inner-side connecting surface ICS1 of the light-shielding portion 110 includes only the first light-shielding surface SS1 and the second light-shielding surface SS2 that have a first extension direction and a second extension direction. In other implementations, in addition to the first light-shielding surface SS1 and the second light-shielding surface SS2, the first inner-side connecting surface ICS1 may further include another light-shielding surface having an extension direction different from those of the first light-shielding surface SS1 and the second light-shielding surface SS2. A person of ordinary skill in the art may correspondingly change an extension direction or a quantity of other light-shielding surfaces as required, and this is not limited in the disclosure. Similarly, the second inner-side connecting surface ICS2 of the supporting portion 120 may also has a similar design, and this is not limited in the disclosure.

Referring to FIG. 3, the first inner-side connecting surface ICS1 of the light-shielding portion 110 and the second inner-side connecting surface ICS2 of the supporting portion 120 define a light transmission port O through which an imaging light passes.

A configuration relationship of the foregoing elements will be described in detail in the following paragraphs.

Referring to FIG. 1A and FIG. 1B, in the present embodiment, theses lens elements L1 to L5 are arranged in sequence along the optical axis I from the object side A1 to the image side A2, and are disposed inside the lens barrel 210. The light-shielding elements BM1 to BM3 are borne in the lens barrel 210. The light-shielding element BM1 is disposed between the lens element L1 and the lens element L2, the light-shielding element BM2 is disposed between the lens element L2 and the lens element L3, and the light-shielding element BM3 is disposed between the lens element L4 and the lens element L5. The spacer element SP is borne in the lens barrel 210 and is disposed between the lens element L3 and the lens element L4, so that the lens element L3 and the lens element L4 are separated by a spacing. The supporting element 100 is borne in the lens barrel 210, and is in contact with the lens barrel 210 and the lens element L5.

More specifically, referring to FIG. 1B, the first surface S of the light-shielding portion 110 of the supporting element 100 faces the object side A1, and the second surface S2 faces the image side A2. In the present embodiment, the light-shielding portion 110 is not in contact with elements (the lens barrel 210 and the lens element L) near the light-shielding portion 110. In other words, the light-shielding portion 110 is exposed in an environment medium (for example, air). In this design, a peripheral element can be prevented from squeezing the light-shielding portion 110 of the supporting element 100 to deform the light-shielding portion 110 when the peripheral element is deformed due to temperature or external force.

In another aspect, referring to FIG. 1A, the third surface S3 of the supporting portion 120 faces toward the object side A1, and the fourth surface S4 faces the image side A2. The supporting portion 120 is borne in the lens barrel 210 via the second outer-side connecting surface OCS2. The supporting element 100 is configured to support a lens element L, and the supporting element 100 is, for example, configured to support the lens element L5. Specifically, the lens element L5 is borne on the third surface S3 of the supporting portion 120 of the supporting element 100 via an image-side optical non-effective surface INS of the lens element L5. In other words, the supporting element 100 is used as a lens retainer.

Figure 5A:
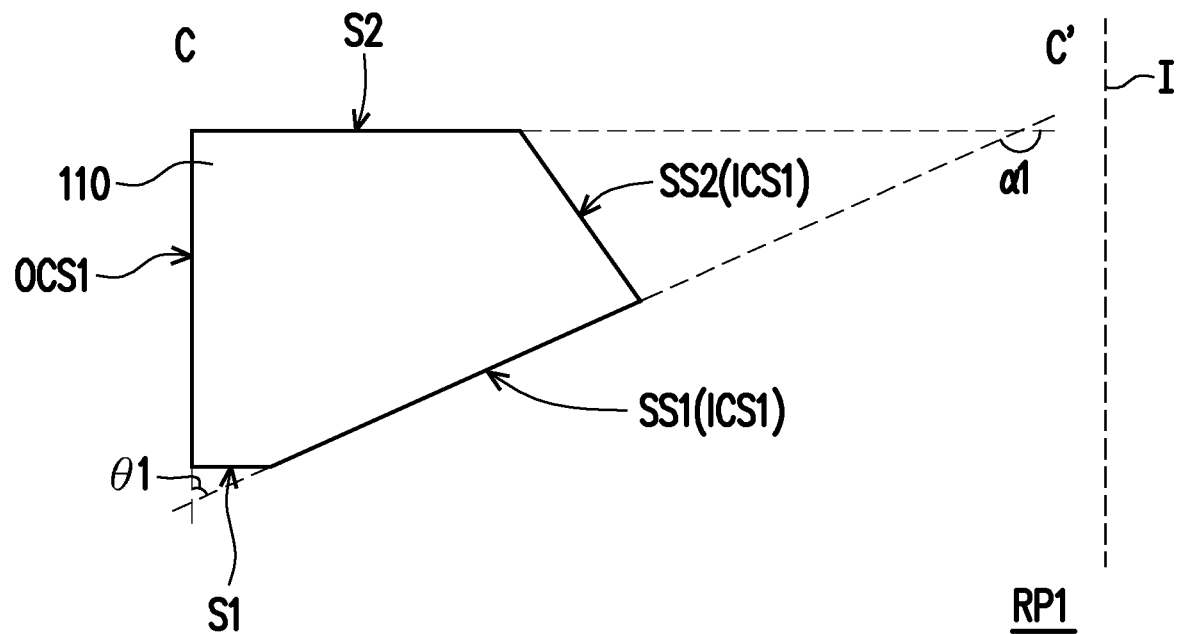
FIG. 5A to FIG. 5C are schematic cross-sectional views of cross-sections at different locations of a light-shielding portion of a supporting element.
Figure 5B:
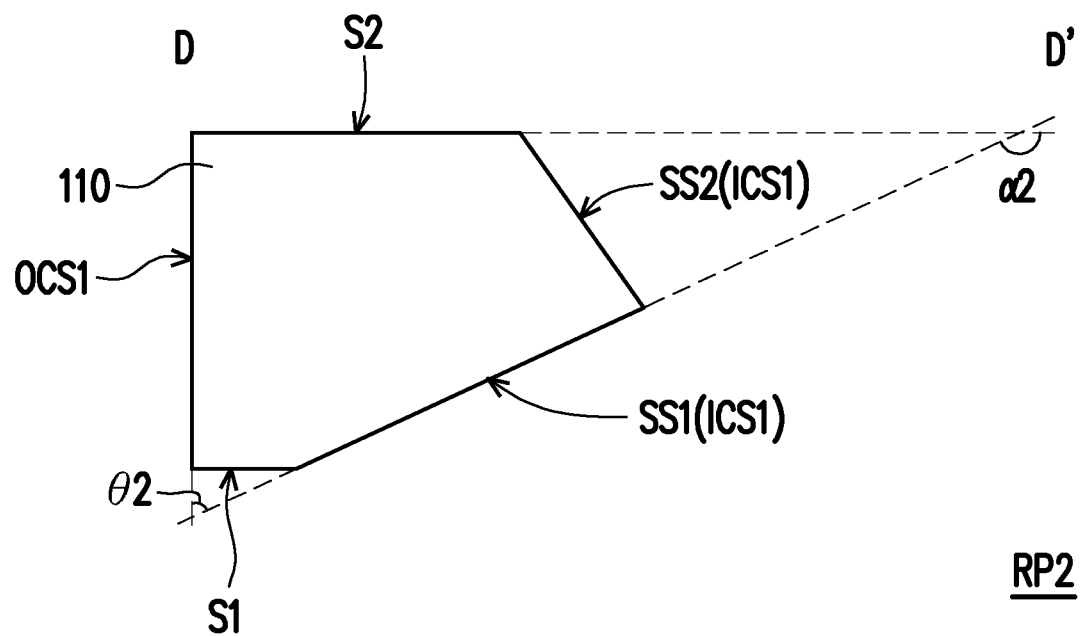
Figure 5C:
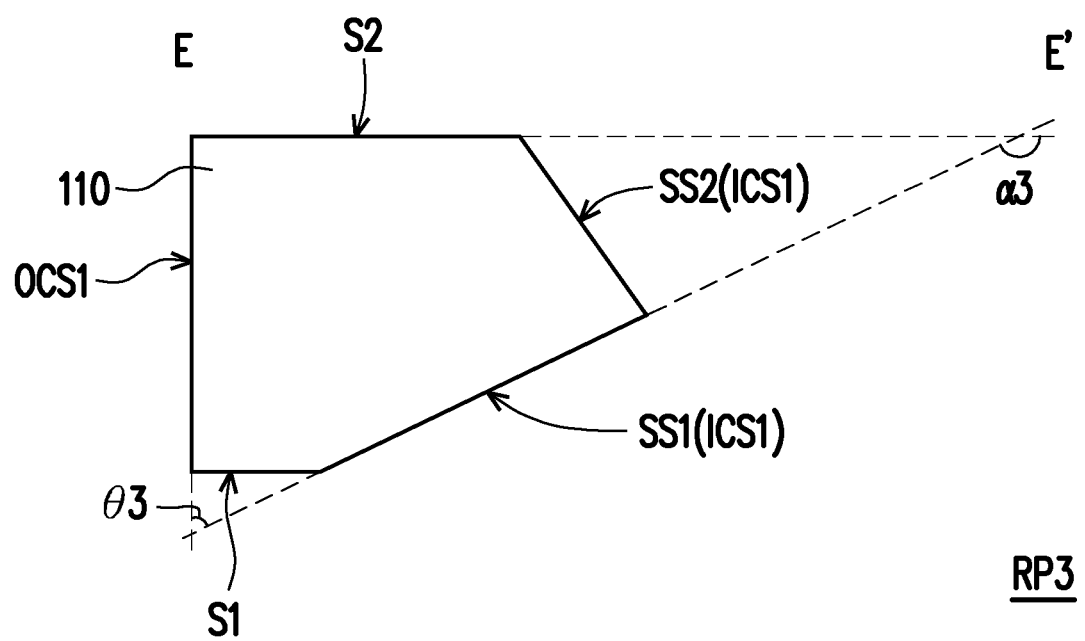

FIG. 5A to FIG. 5C are schematic cross-sectional views of cross-sections at different locations of a light-shielding portion of a supporting element.

In the present embodiment, the supporting element 100 may further satisfy the following two conditions, which will be described in the following paragraphs with reference to FIG. 3 and FIG. 5A to FIG. 5C.

First, a first reference plane RP1 is defined, and the first reference plane RP1 is, for example, a virtual plane that passes the center of the first inner-side connecting surface ICS1 of the light-shielding portion 110 and the center of the first outer-side connecting surface OCS1 and includes the optical axis I, for example, is an XZ plane defined by the X axis and the Z axis. A second reference plane RP2 and a third reference plane RP3 are virtual planes parallel to the first reference plane. A cross-section C-C' in FIG. 5A is the first reference plane RP1, and cross-sections D-D' and E-E' in FIG. 5B and FIG. 5C are respectively the second reference plane RP2 and the third reference plane RP3. Referring to FIG. 3, the first reference plane RP1, the second reference plane RP2, and the third reference plane RP3 respectively intersect with different locations of the first outer-side connecting surface OCS1 and the first inner-side connecting surface ICS1.

Referring to FIG. 5A, the first light-shielding surface SS1 intersects with the first reference plane RP1 to form a first intersection line. The first outer-side connecting surface OCS1 intersects with the first reference plane RP1 to form a second intersection line. An acute angle $\theta 1$ included between an extension line of the first intersection line and an extension line of the second intersection line is less than or equal to 80.00 degrees.

Referring to FIG. 5B, the first light-shielding surface SS1 intersects with the second reference plane RP2 to form another first intersection line. The first outer-side connecting surface OCS1 intersects with the second reference plane RP2 to form another second intersection line. An acute angle $\theta 2$ included between an extension line of the another first intersection line and an extension line of the another second intersection line is less than or equal to 80.00 degrees. The acute angle $\theta 2$ is different from the acute angle $\theta 1$.

Referring to FIG. 5C, the first light-blocking surface SS1 intersects with the third reference plane RP3 to form still another first intersection line. The first outer-side connecting surface OCS1 intersects with the third reference plane RP3 to form still another second intersection line. An acute angle $\theta 3$ included between an extension line of the still another first intersection line and an extension line of the still another second intersection line is less than or equal to 80.00 degrees. The acute angle $\theta 3$ is different from the acute angle $\theta 1$ and the acute angle $\theta 2$.

Preferably, the acute angles $\theta 1$, $\theta 2$, and $\theta 3$ may fall within the following range: 10.00 degrees≤$\theta 1$, $\theta 2$, $\theta 3$≤80.00 degrees. More preferably, the acute angles $\theta 1$, $\theta 2$, and $\theta 3$ may fall within the following range: 20.00 degrees≤$\theta 1$, $\theta 2$, $\theta 3$≤70.00 degrees, where the acute angles $\theta 1$, $\theta 2$, and $\theta 3$ satisfy the foregoing range, so that the supporting element can not only effectively shield flares, but also facilitates processing. Specifically, in FIG. 5A, the acute angle $\theta 1$ is specifically 60.00 degrees. In FIG. 5B, the acute angle $\theta 2$ is specifically 55.00 degrees. In FIG. 5C, the acute angle $\theta 3$ is specifically 50.00 degrees. In other words, in cross-sections at different locations, the acute angles $\theta 1$, $\theta 2$, and $\theta 3$ are different.

In another aspect, referring to FIG. 5A, the first light-shielding surface SS1 intersects with the first reference plane RP1 to form a first intersection line. The second surface S2 intersects with the first reference plane RP1 to form a third intersection line. An obtuse angle $\alpha 1$ included between an extension line of the first intersection line and an extension line of the third intersection line is less than or equal to 170.00 degrees.

Referring to FIG. 5B, the first light-shielding surface SS1 intersects with the second reference plane RP2 to form another first intersection line. The second surface S2 intersects with the second reference plane RP2 to form another third intersection line. An obtuse angle $\alpha 2$ included between an extension line of the another first intersection line and an extension line of the another third intersection line is less than or equal to 170.00 degrees. The obtuse angle $\alpha 2$ is different from the obtuse angle $\alpha 1$.

Referring to FIG. 5C, the first light-blocking surface SS1 intersects with the third reference plane RP3 to form still another first intersection line. The second surface S2 intersects with the third reference plane RP3 to form still another third intersection line. An obtuse angle $\alpha 3$ included between an extension line of the still another first intersection line and an extension line of the still another third intersection line is less than or equal to 170.00 degrees. The obtuse angle $\alpha 3$ is different from the obtuse angles $\alpha 1$ and $\alpha 2$.

Preferably, the obtuse angles $\alpha 1$, $\alpha 2$, and $\alpha 3$ may fall within the following range: 100.00 degrees≤$\alpha 1$, $\alpha 2$, $\alpha 3$≤170.00 degrees. More preferably, the foregoing obtuse angles $\alpha$ may fall within the following range: 110.00 degrees≤$\alpha 1$, $\alpha 2$, $\alpha 3$≤160.00 degrees, where based on size designs of the foregoing obtuse angles $\alpha 1$, $\alpha 2$, and $\alpha 3$, not only flares can be effectively shielded, but processing is also facilitated. Specifically, in FIG. 5A, the obtuse angle $\alpha 1$ is specifically 120.00 degrees. In FIG. 5B, the obtuse angle $\alpha 2$ is specifically 125.00 degrees. In FIG. 5C, the obtuse angle $\alpha 3$ is specifically 130.00 degrees. In other words, in cross-sections at different locations, the obtuse angles $\alpha 1$, $\alpha 2$, and $\alpha 3$ are also different. It should be noted that, in the supporting element 100, if a design in which the acute angle $\theta 1$ is equal to 20.00 degrees and the obtuse angle $\alpha 1$ is equal to 110.00 degrees is used, this design is suitable to a lens element L whose surface shape exhibits more significant concave/convex change (i.e., a lens element with greater difference in surface shape between the periphery region and the optical axis region), and a relatively small acute angle $\theta$ helps make a distance between the supporting portion and the lens element L closer. If a design in which the acute angle $\theta 1$ is equal to 70.00 degrees and the obtuse angle $\alpha 1$ is equal to 160.00 degrees, this design is suitable to a lens element L whose surface shape exhibits less significant concave/convex change (i.e., a lens element with little difference in surface shape between the periphery region and the optical axis region), and a light transmission port O of the supporting element 100 keeps a specific size, and does not affect an imaging light.

Carrying on with the foregoing, compared with a supporting element that is entirely a flat surface in the prior art, in the present embodiment, because the first surface S1 and the second surface S2 of the light-shielding portion 110 are designed as curved surfaces, a size of the lens element L can be reduced, and a size of the lens element L in a radical direction (a direction of the X axis) can be further reduced, thereby avoiding a problem of flares. In addition, the supporting element 100 satisfies one of the foregoing conditions. Condition 1: An acute angle θ included between the extension line of the first intersection line and the extension line of the second intersection line is less than or equal to 80.00 degrees. Condition 2: An obtuse angle α included between the extension line of the first intersection line and the extension line of the third intersection line is less than or equal to 170.00 degrees. The supporting element 100 satisfies one of the foregoing conditions, so that the first light-shielding surface SS1 can be closer to a surface of the lens element L, to further effectively shield flares.

In addition, in the supporting element 100, the first surface S of the light-shielding portion 110 and the third surface S3 of the supporting portion 120 face toward the object side A1, and the second surface S2 of the light-shielding portion 110 and the fourth surface S4 of the supporting portion 120 face toward the image side A2. In other application manners, the first surface S1 of the light-shielding portion 110 and the third surface S3 of the supporting portion 120 may face toward the image side A2 instead, and the second surface S2 of the light-shielding portion 110 and the fourth surface S4 of the supporting portion 120 may face toward the object side A1 instead. This is not limited in the disclosure.

It should be noted herein that, some content in the foregoing embodiments is still used in the following embodiments, and descriptions of the same technical content are omitted. For a same element name, reference may be made to the some content in the foregoing embodiments. The descriptions thereof are omitted in the following embodiments.

Figure 6:
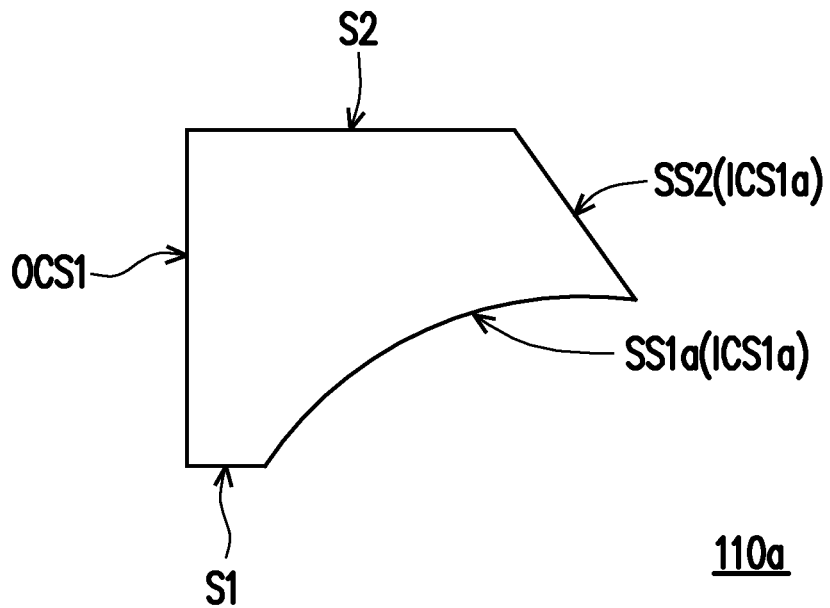
FIG. 6 and FIG. 7 are respectively cross-sectional views of a light-shielding portion of a supporting element according to different embodiments of the disclosure.
Figure 7:
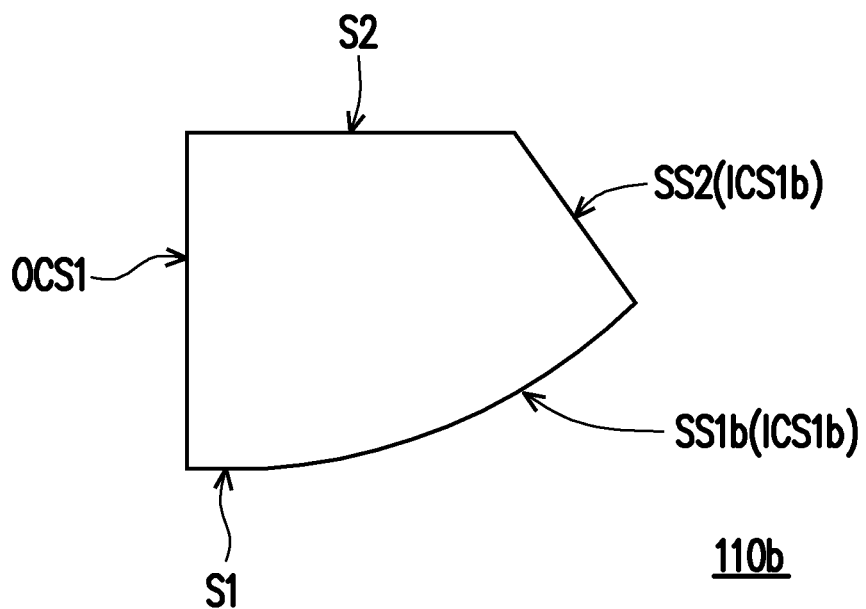
Figure 8:
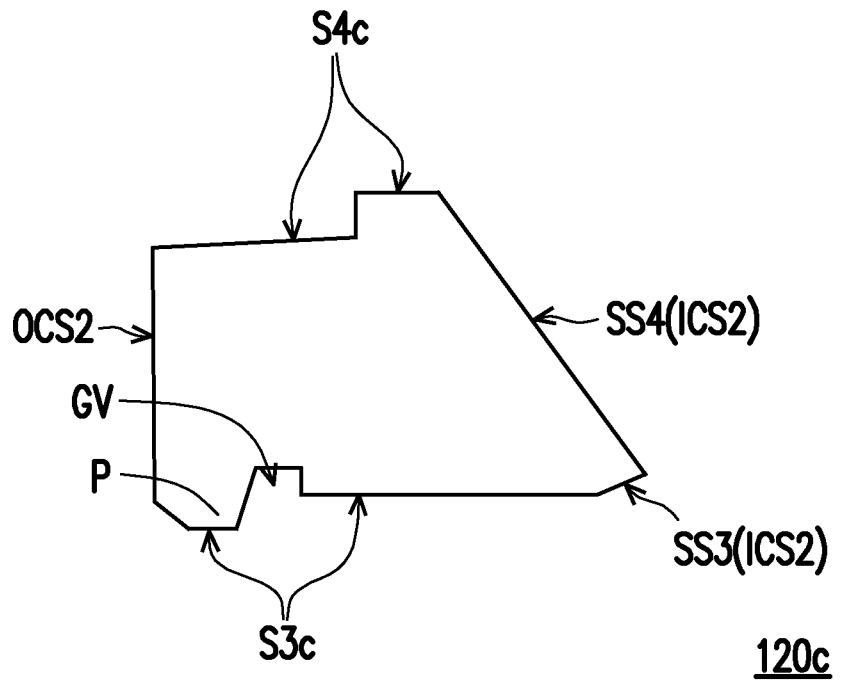
FIG. 8 and FIG. 9 are respectively cross-sectional views of a supporting portion of a supporting element according to different embodiments of the disclosure.
Figure 9:
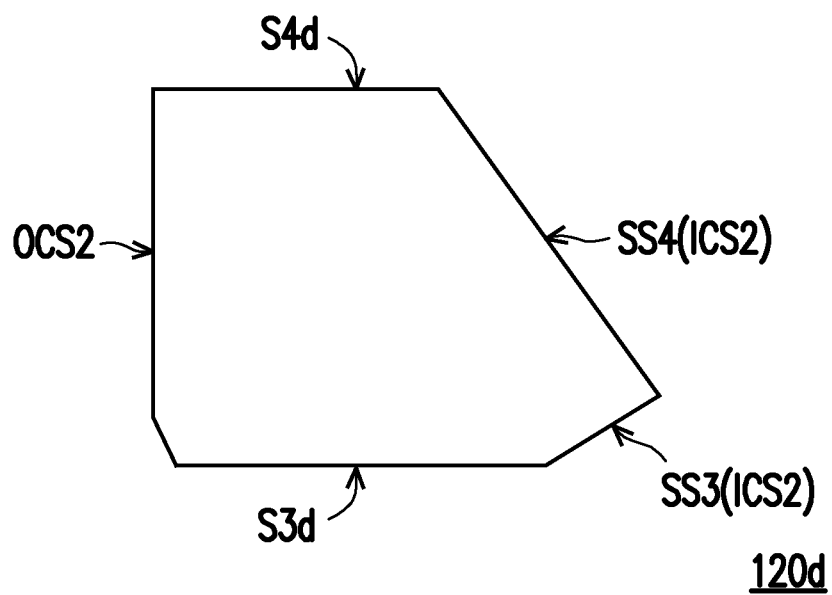

FIG. 6 and FIG. 7 are respectively cross-sectional views of a light-shielding portion of a supporting element according to different embodiments of the disclosure. FIG. 8 and FIG. 9 are respectively cross-sectional views of a supporting portion of a supporting element according to different embodiments of the disclosure.

The foregoing supporting element can be further changed slightly in terms of appearances at different locations. Descriptions are separately provided in the following paragraphs with reference to FIG. 6 to FIG. 9.

Referring to FIG. 6, a light-shielding portion 110a in FIG. 6 is approximately similar to the light-shielding portion 110 in FIG. 4A, and a main difference lies in that a first light-shielding surface SS1a of a first inner-side connecting surface ICS1a of the light-shielding portion 110a is a concave surface.

Referring to FIG. 7, a light-shielding portion 110b in FIG. 7 is approximately similar to the light-shielding portion 110 in FIG. 4A, and a main difference lies in that a first light-shielding surface SS1b of a first inner-side connecting surface ICS1a of the light-shielding portion 110b is a convex surface.

Carrying on with the foregoing, based on different shapes of lens elements, first light-shielding surfaces SS1a and SS1b with different appearance designs may be selected for the light-shielding portions 110a and 110b of the supporting element, so that the light-shielding portions 110a and 110b can be closer to the lens element L, to achieve a fine light-shielding effect.

Referring to FIG. 8, a supporting portion 120c is approximately similar to the supporting portion 120 in FIG. 4B, and a main difference lies in that, in addition to a glue storage groove GV, a third surface S3c of the supporting portion 120c further has a bulge P, where the bulge P is located beside the glue storage groove GV, and is located between the glue storage groove GV and a second outer-side connecting surface OCS2. Due to design of the bulge P, a contact area between the second outer-side connecting surface OCS2 of the supporting portion 120 and the lens barrel 210 can be increased, so that the supporting element and the lens barrel 210 can be attached to each other more stably. In another aspect, on a fourth surface S4c of the supporting portion 120c, a partial surface directly connected to the second outer-side connecting surface OSC2 is designed as an inclined plane. In this design, glue can be more effectively prevented from overflowing to a surface of the lens element L.

Referring to FIG. 9, a supporting portion 120d is approximately similar to the supporting portion 120 in FIG. 4B, and a main difference lies in that a third surface S3d and a fourth surface S4d of the supporting portion 120d may be provided with no glue blocking wall W or glue storage groove GV, and may be disposed between two adjacent lens elements L, so that the two adjacent lens elements are borne on the third surface S3d and the fourth surface S4d as spacer elements. Based on this design, it is easy to process the supporting portion 120d, and supporting of the lens element L is not easily affected.

In addition, the supporting element 100 may further satisfy a following conditional expression, to achieve a better optical effect. Descriptions are provided in the following paragraphs.

Referring to FIG. 4B, in the supporting element 100 in the foregoing embodiment of the disclosure, an included angle β between the second inner-side connecting surface ICS 2 of the supporting portion 120 and the optical axis I is greater than 5.00 degrees. Preferably, β may fall within a range from 5.00 degrees to 75.00 degrees. Based on this design, an imaging light is prevented from being truncated to affect imaging quality.

In the supporting element 100 in the foregoing embodiment of the disclosure, the supporting element 100 may further satisfy a following conditional expression:

$$4.00 \leq D1/D_{max} \leq 27.00, \text{ where}$$

D1 is a minimum distance between the first outer-side connecting surface OCS1 of the light-shielding portion 110 and the optical axis I, and $D_{max}$ is a maximum distance between the first outer-side connecting surface OCS1 and the first inner-side connecting surface ICS1 of the light-shielding portion 110. The foregoing ratio $D1/D_{max}$ falls within this range, so that a light transmission hole O can keep a suitable size, and the light-shielding portion 110 has a specific thickness and a better anti-deformation capability. Preferably, $D1/D_{max}$ may fall within a range from 6.00 to 15.00. In the present embodiment, D1 is 2.30 millimeters, $D_{max}$ is 0.35 millimeters, and $D1/D_{max}$ is 6.57.

In the supporting element 100 in the foregoing embodiment of the disclosure, the supporting element 100 may further satisfy the following conditional expression: 2.00 millimeters≤D1≤4.00 millimeters, where if D1 is greater than 4.00 millimeters, a portable optical imaging lens product is too thick, and does not satisfy a requirement for thin and short, and if D1 is less than 2.00 millimeters, a size of the product is too small, design specifications of a large image height cannot be satisfied. Based on the foregoing conditions, the foregoing problems can be avoided.

Based on the foregoing, in the supporting element and the portable optical imaging lens in the embodiments of the disclosure, because the first surface and the second surface of the light-shielding portion are curved surfaces, a size of the lens element can be reduced, and a size of the lens element in a radical direction can be further reduced.

In addition, a first reference plane is defined, where the first reference plane passes through the center of the first inner-side connecting surface and the center of the first outer-side connecting surface, and includes the optical axis of the portable optical imaging lens. The first light-shielding surface, the first outer-side connecting surface, and the second surface intersect with the first reference plane to form a first intersection line, a second intersection line, and a third intersection line respectively. In the supporting element in the embodiment of the disclosure, an acute angle θ included between an extension line of the first intersection line and an extension line of the second intersection line is less than or equal to 80.00 degrees, or an obtuse angle included between an extension line of the first intersection line and an extension line of the third intersection line is less than or equal to 170.00 degrees. The supporting element satisfies one of the foregoing designs, so that the first light-shielding surface can be closer to a surface of the lens element, and unnecessary flares are further effectively shielded, so that the portable optical imaging lens using the supporting element has fine imaging quality.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. A supporting element, suitable for a portable optical imaging lens with an optical axis, the supporting element comprising:
    a light-shielding portion comprising a first surface, a second surface, a first inner-side connecting surface, and a first outer-side connecting surface, the first inner-side connecting surface and the first outer-side connecting surface connecting the first surface and the second surface, the first inner-side connecting surface facing toward the inside of the supporting element, and the first outer-side connecting surface facing toward the outside of the supporting element, wherein the first surface and the second surface are curved surfaces, and the first inner-side connecting surface further comprises a first light-shielding surface adjacent to the first surface; and
    a supporting portion connected to the light-shielding portion, configured to support a lens element or a lens barrel of the portable optical imaging lens and comprising a third surface, a fourth surface, a second inner-side connecting surface, and a second outer-side connecting surface, wherein the second inner-side connecting surface and the second outer-side connecting surface connect the third surface and the fourth surface, the second inner-side connecting surface faces toward the inside of the supporting element, and the second outer-side connecting surface faces toward the outside of the supporting element,
    wherein a first reference plane is defined, the first reference plane passes through a center of the first inner-side connecting surface and a center of the first outer-side connecting surface of the light-shielding portion and comprises the optical axis, the first reference plane only intersects with the light-shielding portion to form a cross-section, the first light-shielding surface intersects with the first reference plane to form a first intersection line, and the first outer-side connecting surface intersects with the first reference plane to form a second intersection line,
    wherein an acute angle θ1 included between an extension line of the first intersection line and an extension line of the second intersection line is less than or equal to 80.00 degrees.

2. The supporting element according to claim 1, wherein the first surface and the second surface of the light-shielding portion are aspheric surfaces.

3. The supporting element according to claim 1, wherein in the supporting portion, at least one of the third surface and the fourth surface comprises a glue blocking wall or a glue storage groove.

4. The supporting element according to claim 3, wherein a groove depth of the glue storage groove is within a range from 0.01 millimeters to 0.15 millimeters.

5. The supporting element according to claim 3, wherein at least one of the third surface and the fourth surface comprises the glue storage groove and a bulge, and the bulge is located beside the glue storage groove and located between the second outer-side connecting surface and the glue storage groove.

6. The supporting element according to claim 1, wherein the supporting element satisfies a following conditional expression:

$$4.00 \le D1/D_{max} \le 27.00,$$

wherein D1 is a minimum distance between the first outer-side connecting surface of the light-shielding portion and the optical axis, and $D_{max}$ is a maximum distance between the first outer-side connecting surface and the first inner-side connecting surface of the light-shielding portion.

7. The supporting element according to claim 1, wherein the supporting element satisfies a following conditional expression: 2.00 millimeters≤D1≤4.00 millimeters, wherein D1 is a minimum distance between the first outer-side connecting surface of the light-shielding portion and the optical axis.

8. The supporting element according to claim 1, wherein in the light-shielding portion, the first light-shielding surface of the first inner-side connecting surface is an arc surface.

9. A supporting element, suitable for a portable optical imaging lens with an optical axis, the supporting element comprising:
    a light-shielding portion comprising a first surface, a second surface, a first inner-side connecting surface, and a first outer-side connecting surface, the first inner-side connecting surface and the first outer-side connecting surface connecting the first surface and the second surface, the first inner-side connecting surface facing toward the inside of the supporting element, and the first outer-side connecting surface facing toward the outside of the supporting element, wherein the first surface and the second surface are curved surfaces, and the first inner-side connecting surface further comprises a first light-shielding surface adjacent to the first surface; and a supporting portion connected to the light-shielding portion, configured to support a lens element or a lens barrel of the portable optical imaging lens and comprising a third surface, a fourth surface, a second inner-side connecting surface, and a second outer-side connecting surface, wherein the second inner-side connecting surface and the second outer-side connecting surface connect the third surface and the fourth surface, the second inner-side connecting surface faces toward the inside of the supporting element, and the second outer-side connecting surface faces toward the outside of the supporting element, wherein a first reference plane is defined, the first reference plane passes through a center of the first inner-side connecting surface and a center of the first outer-side connecting surface of the light-shielding portion and comprises the optical axis, the first reference plane only intersects with the light-shielding portion to form a cross-section, the first light-shielding surface intersects with the first reference plane to form a first intersection line, and the second surface intersects with the first reference plane to form a third intersection line, wherein an obtuse angle α1 included between an extension line of the first intersection line and an extension line of the third intersection line is less than or equal to 170.00 degrees.

10. The supporting element according to claim 9, wherein the first surface and the second surface of the light-shielding portion are aspheric surfaces.

11. The supporting element according to claim 9, wherein in the supporting portion, at least one of the third surface and the fourth surface comprises a glue blocking wall or a glue storage groove.

12. The supporting element according to claim 9, wherein the supporting element satisfies a following conditional expression:

$4.00 \leq D1/D_{max} \leq 27.00$, wherein D1 is a minimum distance between the first outer-side connecting surface of the light-shielding portion and the optical axis, and $D_{max}$ is a maximum distance between the first outer-side connecting surface and the first inner-side connecting surface of the light-shielding portion.

13. The supporting element according to claim 9, wherein the supporting element satisfies a following conditional expression: 2.00 millimeters≤D1≤4.00 millimeters, wherein D1 is a minimum distance between the first outer-side connecting surface of the light-shielding portion and the optical axis.

14. The supporting element according to claim 9, wherein in the light-shielding portion, the first light-shielding surface of the first inner-side connecting surface is an arc surface.

15. A portable optical imaging lens, comprising:
a lens barrel;
a plurality of lens elements having refractive power sequentially arranged along an optical axis from an object side to an image side and disposed in the lens cone; and
a supporting element disposed in the lens barrel and comprising a light-shielding portion and a supporting portion connected to the light-shielding portion, wherein the light-shielding portion comprises a first surface, a second surface, a first inner-side connecting surface, and a first outer-side connecting surface, the first inner-side connecting surface and the first outer-side connecting surface connect the first surface and the second surface, the first inner-side connecting surface faces toward the inside of the supporting element, the first outer-side connecting surface faces toward the outside of the supporting element, wherein the first surface and the second surface are curved surfaces, and the first inner-side connecting surface further comprises a first light-shielding surface adjacent to the first surface, the supporting portion is configured to support a lens element of the portable optical imaging lens and comprises a third surface, a fourth surface, a second inner-side connecting surface, and a second outer-side connecting surface, and the second inner-side connecting surface and the second outer-side connecting surface connect the third surface and the fourth surface, the second inner-side connecting surface faces toward the inside of the supporting element, and the second outer-side connecting surface faces toward the outside of the supporting element, a first reference plane is defined, the first reference plane passes through a center of the first inner-side connecting surface portion and a center of the first outer-side connecting surface of the light-shielding and comprises the optical axis, the first reference plane only intersects with the light-shielding portion to form a cross-section, the first light-shielding surface intersects with the first reference plane to form a first intersection line, and the first outer-side connecting surface intersects with the first reference plane to form a second intersection line, wherein an acute angle θ1 included between an extension line of the first intersection line and an extension line of the second intersection line is less than or equal to 80.00 degrees.

16. The portable optical imaging lens according to claim 15, wherein the first surface and the second surface of the light-shielding portion are aspheric surfaces.

17. The portable optical imaging lens according to claim 15, wherein in the supporting portion, at least one of the third surface and the fourth surface comprises a glue blocking wall or a glue storage groove.

18. The portable optical imaging lens according to claim 15, wherein the supporting element satisfies a following conditional expression:

$4.00 \leq D1/D_{max} \leq 27.00$, wherein D1 is a minimum stance between the first outer-side connecting surface of the light-shielding portion and the optical axis, and $D_{max}$ is a maximum distance between the first outer-side connecting surface and the first inner-side connecting surface of the light-shielding portion.

19. The portable optical imaging lens according to claim 15, wherein the supporting element satisfies a following conditional expression: 2.00 millimeters≤D1≤4.00 millimeters, wherein D1 is a minimum distance between the first outer-side connecting surface of the light-shielding portion and the optical axis.

* * * * *